United States Patent [19]
Jaeger et al.

[11] Patent Number: 5,084,099
[45] Date of Patent: Jan. 28, 1992

[54] PHASE CHANGE INK COLORANTS AND PHASE CHANGE INKS PRODUCED THEREFROM

[75] Inventors: C. Wayne Jaeger, Beaverton; Curtis F. Sheley, Corvallis, both of Oreg.

[73] Assignee: Tektronix, Inc., Beaverton, Oreg.

[21] Appl. No.: 716,429

[22] Filed: Jun. 17, 1991

[51] Int. Cl.$^5$ .............................................. C09D 11/02
[52] U.S. Cl. ........................................ 106/22; 106/20
[58] Field of Search ..................................... 106/20, 22

[56] References Cited

U.S. PATENT DOCUMENTS

| | | | |
|---|---|---|---|
| 3,994,872 | 11/1976 | Kuster ................................. | 106/22 |
| 4,133,695 | 1/1979 | Wheeler et al. .................... | 106/411 |
| 4,664,715 | 5/1987 | Jesse ................................... | 106/402 |
| 4,786,327 | 11/1988 | Wenzel et al. ...................... | 106/22 |

*Primary Examiner*—William R. Dixon, Jr.
*Assistant Examiner*—Helene Klemanski
*Attorney, Agent, or Firm*—John D. Winkleman; Jerome S. Marger

[57] ABSTRACT

This invention relates to modified phase change ink compatible colorants which comprise a phase change ink soluble complex of (a) a tertiary alkyl primary amine and (b) dye chromophores, i.e., materials that absorb light in the visible wavelength region to produce color having at least one pendant acid functional group in the free acid form (not the salt of that acid). These modified colorants are extremely useful in producing phase change inks when combined with a phase change ink carrier, even though the unmodified dye chromophores have limited solubility in the phase change ink carrier. Thin films of uniform thickness of the subject phase change ink compositions which employ the modified phase change ink colorants exhibit a high degree of lightness and chroma. The primary amine-dye chromphore complexes are soluble in the phase change ink carrier and exhibit excellent thermal stability.

26 Claims, No Drawings

PHASE CHANGE INK COLORANTS AND PHASE CHANGE INKS PRODUCED THEREFROM

BACKGROUND OF THE INVENTION

The present invention relates to phase change ink compatible colorants, to the use of these phase change ink compatible colorants in phase change inks, and to phase change inks produced therefrom which are employed in phase change ink jet printing devices.

In general, phase change inks are in the solid phase at ambient temperature, but exist in liquid phase at the elevated operating temperature of an ink jet printing device. At the liquid phase ink jet operating temperature, droplets of liquid ink are ejected from the printing device and, when the ink droplets contact the surface of a wide variety of printing media, they quickly solidify to form a predetermined pattern of solidified ink drops.

Phase change ink is desirable since it remains in a solid phase at room temperature, during shipping, long-term storage, etc. Also, the problems associated with nozzle clogging due to ink evaporation are largely eliminated, thereby improving the reliability of ink jet printing. Furthermore, since the ink droplets solidify immediately upon contact with the substrate, migration of ink along the printing medium is prevented and dot quality is improved.

The initial prior art on phase change inks for ink jet printing involved monochrome inks jetted by electrostatic printing devices. Thus, for example in U.S. Pat. No. 3,653,932, a low melting ink (30° C. to 50° C.) is provided employing an ink base comprising di-esters of sebacic acid. In a similar process, U.S. Pat. No. 3,715,219 describes another low melting point ink (30° C. to 60° C.) comprising a paraffin alcohol-based ink. However, when low melting point phase change inks are employed in printing onto a substrate, they exhibit offset problems, namely, when the printed substrates formed from these inks are stacked and stored for subsequent use, they can become adhered to one another, particularly if high ambient temperatures are experienced.

U.S. Pat. No. 4,390,369 and U.S. Pat. No. 4,484,948 describe methods for producing monochrome phase change inks which employ a natural wax ink base, such as Japan wax, candelilla wax, carnauba wax, etc., which is printed from a drop-on-demand ink jet device at a temperature ranging between 65° C. and 75° C. In U.S. Pat. No. 4,659,383, a monochrome ink composition is provided having an ink base comprising a C20-24 acid or alcohol, a ketone, and an acrylic resin plasticizer. These monochrome ink compositions are not durable and when printed can be smudged with routine handling and folding.

In Japanese patent application 128,053/78, amides which are solid at room temperature, such as acetamide, are employed as printing inks. U.S. Pat. No. 4,684,956 is directed to monochrome phase change inks utilizing synthetic microcrystalline wax (hydrocarbon wax) and microcrystalline polyethylene wax. This molten composition can be applied to a variety of porous and non-porous substrates using drop-on-demand ink jet application techniques.

EP 0187352 and EP 0206286 reference phase change ink jet printing in color. The ink bases for these systems comprise fatty acids, a thermoplastic polyethylene and a phase change material in the first application; and the alcohol portion of a thermal setting resin pair, a mixture of organic solvents (o- and p-toluene sulfonamide) and a dye in the second application.

Jet printing colored inks onto a light transmissive medium for displaying color images by overhead projection has historically been a problem. For example, in the case of aqueous inks, special coatings must be provided on the light transmissive medium in order to absorb the aqueous phase so that images of high quality are formed. See, for example, U.S. Pat. No. 4,503,111, U.S. Pat. No. 4,547,405 and U.S. Pat. No. 4,555,437. Even though special coatings are not required on receptor films used for phase change ink jet printing, when prior art color phase change inks are applied in a thin film of substantially uniform thickness to a light transmissive receiver sheet, they are not rectilinearly light transmissive. It is this rectilinearly light transmissive property which creates intense, saturated colors.

In U.S. Pat. No. 4,830,671, a hot-melt or phase change color ink composition is provided having the properties of stability and uniformity of performance under ink jet printing conditions. The resinous binder for the above-described phase change ink is the condensation reaction product of one equivalent of polmerized fatty acid, two equivalents of diamine and two equivalents of a monocarboxylic acid.

A phase change ink composition is described in U.S. Pat. No. 4,889,560, and in U.S. Pat. No. 4,992,304, and in U.S. Ser. No. 07/389,222, all of which are assigned to the assignee of this patent application. U.S. Pat. No. 4,889,560 and U.S. Pat. No. 4,992,304 are incorporated herein by reference. The carrier composition is preferably a fatty amide-containing compound. The thin films of a substantially uniform thickness of this ink composition are also rectilinearly light transmissive.

The phase change ink carrier composition forms an ink by combination with a phase change ink compatible colorant. Preferably, a colored phase change ink will be formed by combining the above-described ink carrier composition with compatible subtractive primary colorants. The subtractive primary colored phase change inks of this invention comprise four component dyes, namely, cyan, magenta, yellow and black. The subtractive primary colorants employed typically comprise dyes from either class of Color Index (C.I.) Solvent Dyes and Disperse Dyes, and a limited number of Basic Dyes.

Many dyes having ionic functional groups, as for example, Acid Dyes and Direct Dyes, are soluble in aqueous ink systems, and exhibit visually desirable colors. However, these dyes have been found to be minimally soluble in non-polar, non-aqueous phase change ink systems.

SUMMARY OF THE INVENTION

It has now been discovered by applicants that polar, aqueous soluble dyes which exhibit the above-described problems when used in phase change ink systems can be chemically modified to form the phase change ink compatible colorants of the present invention. For purposes of this invention, the term "chemically modified" means the formation of modified phase change ink compatible colorants which comprise the hereinafter described phase change ink soluble complex of constituents (a) and (b). These modified phase change ink compatible colorants can be effectively combined with a phase change ink carrier composition to produce modified phase change inks.

The modified phase change ink compatible colorants of this invention comprise a phase change ink soluble complex of (a) a tertiary alkyl primary amine and (b) dye chromophores, i.e., materials that absorb light in the visible wavelength region to produce color having at least one pendant acid functional group in the free acid form (not the salt of that acid). These modified colorants are extremely useful in producing phase change inks when combined with a phase change ink carrier, even though the unmodified dye chromophores have limited solubility in the phase change ink carrier. Thus, thin films of uniform thickness of the subject phase change ink compositions which employ the modified phase change ink colorants exhibit a high degree of lightness and chroma. The primary amine-dye chromphore complexes formed according to the teachings of the present invention are soluble in the phase change ink carrier and exhibit excellent thermal stability.

The foregoing and other objects, features and advantages of the invention will become more readily apparent from the following detailed description of the invention.

DETAILED DESCRIPTION OF THE INVENTION

This invention is directed to modified phase change ink colorants useful in producing phase change inks. The modified phase change ink colorants produce a phase change ink composition in combination with a phase change ink carrier as hereinafter described. As previously stated, the modified phase change ink colorants of the present invention comprise a phase change ink soluble complex of (a) a tertiary alkyl primary amine and (b) dye chromophores having at least one pendant acid functional group in the free, acid form. Each of the dye chromophores employed in producing the modified phase change ink colorants are characterized as follows: (1) the unmodified counterpart dye chromophores employed in the formation of the subject chemically modified dye chromophores have limited solubility in the phase change ink carrier compositions of this invention, (2) the chemically modified dye chromophores have at least one free acid group, and (3) the chemically modified dye chromophores form phase change ink soluble complexes with tertiary alkyl primary amines. For example, the modified phase change ink colorants of this invention can be produced from unmodified dye chromophore such as the class of Color Index dyes referred to as Acid or Direct dyes. These unmodified dye chromophores have limited solubility in the phase change ink carrier so that insufficient color is produced from inks made from these carriers. The modified dye chromophore preferably comprises a free acid derivative of a xanthene dye. The dye chromophore more preferably comprises a composition represented by the structural formula:

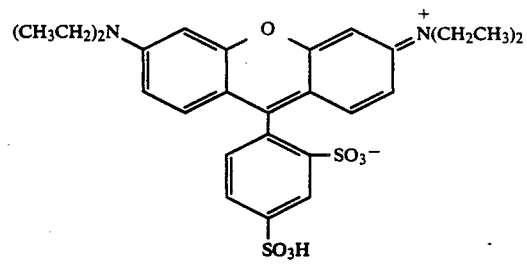

The structural formula represents the free acid form of Acid Red 52 dye. The phase change ink composition formed by combining the free acid form of Acid Red 52 having the above structural formula with a tertiary alkyl primary amine forms a magenta dye which, when combined with a phase change ink carrier composition as described below, produces a phase change ink which exhibits an intense, saturated color and a high level of thermal stability.

The tertiary alkyl primary amine of the present invention typically includes alkyl groups having a total of from 12 to 22 carbon atoms, and preferably from 12 to 14 carbon atoms. The tertiary alkyl primary amines of particular interest are produced by Rohm and Haas Texas, Incorporated of Houston, Tex., under the tradenames Primene JMT and Primene 81-R. Primene 81-R is the preferred material. The tertiary alkyl primary amine of this invention comprises a composition represented by the structural formula:

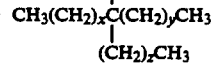

$x = 0–18$
$y = 0–18$
$z = 0–18$
$x + y + z = 8$ to $18$

The subject phase change ink carrier composition typically comprises a fatty amide-containing material. The fatty amide-containing material of the phase change ink carrier composition of the present invention preferably comprises a tetra-amide compound. The preferred tetra-amide compounds for producing the phase change ink carrier composition are Dimer acid-based tetra-amides which preferably include the reaction product of a fatty acid, a diamine (ethylene diamine) and a Dimer acid. For purposes of this invention, the term Dimer acid preferably means a hydrogenated oleic acid dimer product. A preferred example of such a Dimer Acid is a product known as Empol 1008 Dimer Acid, manufactured by the Emery Division of Henkel Corporation of Cincinnati, Ohio. Fatty acids having from 10 to 22 carbon atoms are preferably employed in the formation of the Dimer acid-based tetra-amide. These Dimer acid-based tetra-amides are produced by Union Camp and comprise the reaction product of ethylene diamine, Dimer acid, and the following fatty acids: decanoic acid (Union Camp X3202-23), myristic acid (Union Camp X3202-56), stearic acid (Union Camp X3138-43, X3164-23, X3202-44, X3202-46, X3222-65, X3261-37, X3261-53, and X3290-72), docasanic acid (Union Camp X3202-36). For the purposes of this invention, the most preferred Dimer acid-based tetra-amide is the reaction product of Dimer acid, ethylene diamine and stearic acid in a stoichiometric ratio of 1:2:2. Stearic acid is the preferred fatty acid reactant because its adduct with Dimer acid and ethylene diamine has the lowest viscosity of the Dimer acid-based tetra-amides. Its ingredients also are the most readily available and therefore lowest in cost.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as Kemamide S, manufactured by Witco Chemical Company, can be employed herein. As for the secondary mono-amides, behenyl behenamide (Kemamide EX-666), and stearyl stearamide (Kemamide S-180 and Kemamide EX-672), all manufactured by Witco Chemical Company, are extremely useful mono-amides. However, stearyl stearamide is the mono-amide of choice in producing the phase change ink carrier composition of the present invention.

Another way of describing the preferred secondary mono-amide compound of this invention is by structural formula. More specifically, the secondary mono-amide compound comprised as a composition which is represented by the structural formula:

$$C_xH_y-CO-NHC_aH_b$$

wherein:
x is an integer from 5 to 21
y is an integer from 11 to 43
a is an integer from 6 to 22
b is an integer from 13 to 45

The preferred fatty amide-containing compounds of this invention comprise a plurality of fatty amide materials which are compatible with each other. Typically, even when a plurality of fatty amide-containing compounds are employed to produce the phase change ink carrier composition, the carrier composition has a substantially single melting point transition. The melting point of the phase change ink carrier composition is preferably at least about 70° C., more preferably at least about 80° C., and most preferably at least about 85° C.

The preferred phase change ink carrier composition comprises a tetra-amide and a mono-amide. The weight ratio of the tetra-amide to the mono-amide in the preferred instance is from about 2:1 to 1:10, and more preferably, from about 1:1 to 1:3.

In order to add more flexibility and adhesion to the phase change ink carrier composition, a tackifier can be employed. The preferred tackifiers are those which are compatible with fatty amide-containing materials. These include, for example, KE-311 Resin, a glycerol ester of hydrogenated abietic (rosin) acid made by Arakawa Chemical Industries, Ltd., Foral 85, a glycerol ester of hydrogenated abietic (rosin) acid, and Foral 105, a pentaerythritol ester of hydroabietic (rosin) acid, both manufactured by Hercules Chemical Company, Nevtac 100 and Nevtac 80, synthetic polyterpene resins manufactured by Neville Chemical Company, and Wingtack 86, a modified synthetic polyterpene resin manufactured by Goodyear Chemical Company. However, Arakawa KE-311 resin is the tackifier of choice in producing the phase change ink carrier composition of the present invention.

Other materials may be added to the phase change ink carrier composition. In a typical phase change ink chemical composition antioxidants are added for preventing discoloration of the carrier composition. The preferred antioxidant materials can include Irganox 1010 manufactured by Ciba Geigy; and Naugard 76, Naugard 512, and Naugard 524 manufactured by Uniroyal Chemical Company; the most preferred antioxidant being Naugard 524.

In a preferred case, the phase change ink carrier composition comprises a tetra-amide and a mono-amide compound, a tackifier, and an antioxidant. The preferred compositional ranges of this phase change ink carrier composition are as follows: From about 10 to 50 weight percent of a tetra-amide compound, from about 30 to 80 weight percent of a mono-amide compound, from about 0 to 40 weight percent of a tackifier, and 0 to 2 percent of an antioxidant.

As previously indicated, the subject phase change ink formed from the phase change ink carrier composition exhibits excellent physical properties. For example, the subject phase change ink, unlike prior art phase change inks, exhibits a high level of lightness, chroma, and rectilinear light transmissivity when utilized in a thin film of substantially uniform thickness, so that color images can be conveyed using overhead projection techniques.

The transmission spectra for each of the phase change inks used in this invention were evaluated on a commercially available spectrophotometer, the ACS Spectro-Sensor II, in accordance with the measuring methods stipulated in ASTM E805 (Standard Practice of Instrumental Methods of Color or Color Difference Measurements of Materials) using the appropriate calibration standards supplied by the instrument manufacturer. For purposes of verifying and quantifying the overall colorimetric performance of this invention, measurement data were reduced, via tristimulus integration, following ASTM E308 (Standard Method for Computing the Colors of Objects using the CIE System) in order to calculate the 1976 CIE L* (Lightness), a* (redness-greeness), and b* (yellowness-blueness), (CIELAB) values for each phase change ink sample. In addition, the values for CIELAB Psychometric Chroma, $C^*_{ab}$, and CIELAB Psychometric Hue Angle, $h_{ab}$ were calculated according to publication CIE 15.2, Colorimetry (Second Edition, Central Bureau de la CIE, Vienna, 1986).

The phase change inks formed herein have a relatively high $C^*_{ab}$ value when measured as a thin film of substantially uniform thickness test procedure in (See Example 4), or as an ink array on a sheet of white paper (see reflectance spectra procedure in Example 3).. Conventional phase change inks have a very low degree of rectilinear light transmissivity, even in thin films of substantially uniform thickness. The phase change ink composition of this invention has a $C^*_{ab}$ value, as a substantially uniform thin film of about 20 micron thickness, or when measured by a reflectance spectra test under the test conditions described in Example 3, below, of subtractive primary yellow, magenta and cyan color phase change ink compositions, is preferably are at least about 40 for said yellow ink composition, at least about 60 for said magenta ink composition, and at least about 25 for said cyan ink composition. More preferably, the $C^*_{ab}$ value of the subtractive primary yellow, magenta and cyan color phase change ink compositions are at least about 50, 70, and 30, respectively; and most preferably these $C^*_{ab}$ values are at least about 55, 75, and 34, respectively.

It is also important that the black color phase change ink component be at a minimum light transmissivity level so that the color intensity of the ink is maximized. Accordingly, the $L^*$ value of a substantially uniform thin film of about 20 micron thickness of a black color phase change ink is preferably not more than about 30, more preferably not more than about 25, and most preferably not more than about 20.

The respective phase change ink and ink carrier compositions are quite durable. One indication of durability is abrasion resistance. For purposes of this invention, abrasion resistance is determined by testing a print sample of the phase change ink produced from the carrier composition in a Teledyne Taber Abrader, Model 5130, utilizing CS-10 Abrasion wheels loaded with 500 gram weights. The abrader wheels are resurfaced after each sample with an S-11 resurfacing disk. Samples printed on paper were tested according to ASTM D4060-84 (Standard Test Method For Abrasion Resistance of Organic Coatings by the Taber Abrader). Samples printed on light transmissive thin films were tested using ASTM D1044-85 (Standard Test Method For Resistance of Transparent Plastics to Surface Abrasion). Print samples were tested as described above, and the results of those tests demonstrated excellent abrasion resistance.

A further physical property employed to evaluate the durability of phase change inks and ink carrier compositions is offset transfer. This property is evaluated by a blocking (offsetting) test which determines whether the phase change ink printed on a substrate will adhere to an adjacent substrate at ambient or elevated temperatures when the printed products are stacked one on top of the other. The blocking test is conducted by printing samples of the phase change ink produced from the carrier composition on to a paper or thin film substrate and placing same in a manila folder under a one pound piece of aluminum, 8.5 inches wide and 11 inches long, which evenly distributes the weight of a 10 pound block. These printed samples reside in an oven for 24 hours at a constant temperature of 70° C. Print samples of the phase change ink were subjected to the above described blocking test and showed no signs of offsetting, spreading or adhesion.

Another important property of phase change inks is viscosity. The viscosity of the molten ink must be matched to the requirements of the ink jet device and optimized versus other physical properties of the ink. For purposes of this invention, the viscosity of the phase change ink is measured on a Ferranti-Shirley Cone Plate Viscometer with a large cone. It is preferred that the viscosity of the phase change ink carrier composition, at 140° C., and in turn the ink composition of this invention, is from about 5 to 30 centipoise, and more preferably from about 10 to 20 centipoise, most preferably from about 12 to 14 centipoise.

EXAMPLE 1

This example demonstrates a method of producing the preferred phase change ink colorant composition employed in producing the phase change ink composition of EXAMPLE 2 below (Method A) and an alternate method for forming the phase change ink colorant in situ during the phase change ink formation process (Method B).

(Method A) In a typical preparation of the acid form of Acid Red 52, 5.0g. of the water soluble dye (C.I. Acid Red 52) were dissolved in 100 mls. deionized water at room temperature and filtered through Whatman number 40 filter paper. To this solution were added 3 mls. of concentrated sulfuric acid with stirring. A green, crystalline precipitate of the acid form of the dye formed immediately. The acidified mixture was chilled to 5-10 deg C. overnight to complete the precipitation, filtered through Whatman number 541 paper, the green precipitate washed three times with 20 ml. portions of cold water to remove mineral salts and the product dried under vacuum. The yield of the free acid form of C.I. Acid Red 52 colorant amounted to 4.8 g.

The amine complex of the free acid form of the dye is formed by an association of the dye with the Primene 81-R (Rohm and Haas Texas Inc.). In a typical preparation, 5.0 g. Neolan Red E-XB 400 FA (free acid form of C.I. Acid red 52 produced by Ciba-Geigy) were mixed with 1.75 grams Pimene 81-R (avg. molecular wt.=213) in 50 ml of methanol, and the solution stirred 30 minutes at room temperature. The solvent was removed using a rotary evaporator to yield a dark green syrup. Removal of the last traces of methanol solvent under a rough pump vacuum produced 6.5 grams of lustrous green crystals of the Primene complex. This material, referred to as Rhodamine P, is then combined with a phase change ink carrier composition as provided in EXAMPLE 2.

(Method B) The Primene complex of the free acid form of C.I. Acid Red 52 colorant may also be formed in situ. In a typical procedure, 1.4 kg. of the phase change ink carrier composition described in EXAMPLE 2 is warmed to 100-120 deg C. with stirring in a closed container. To this is added 3.2 g. (0.23% by weight) of Primene 81-R, followed immediately by the addition of 8.4 grams (0.60 % by weight) of the free acid form of C.I. Acid Red 52 colorant. Stirring was continued another 5 minutes. At the end of this time, the ink preparation was forced filtered with a 30 psig nitrogen pressure through a heated Mott filter apparatus 6.0 cm i.d. by 42 cm. length. A 0.2 micron nylon membrane filter supported on a 40 micron stainless steel disc serves as the filter element.

EXAMPLE 2

This example demonstrates a method of producing a preferred phase change ink by combining the preferred phase change ink colorant composition of EXAMPLE 1, Method A and a preferred phase change ink carrier composition.

More specifically, solid phase change ink ingots of the substractive primary colors were produced as follows: 56 grams of Kemamide S-180 (Witco Corporation), 30 grams of Unirez X37-523-235 (a Dimer acid-based tetra-amide material manufactured by Union Camp and formed by the reaction of one mole of dimer acid, two moles of ethylene diamine, and two moles of stearic acid), 10 grams of Arakawa KE-311 Resin, and 0.1 grams of Naugard 524 were melted at 110 degrees C. When the mixture was completely molten and uniform, 0.75 grams of the Rhodamine P dye (the free acid form of C.I. Acid Red 52 colorant complexed with 1 equivalent of Primene 81-R) were added to the molten ink carrier and stirred at 100 degrees C. for about one hour. After a homogeneous solution of the material was achieved, the molten ink was filtered through a heated filter. The filtrate was poured into molds and allowed to solidify. Solid ink ingots of the magenta colorant were formed.

The above procedure was repeated with the other primary colorants required for ink jet color printing being substituted for the magenta colorant as follows: 0.9 grams of Orasol Yellow 4GN (C.I. Solvent Yellow 146 from Ciba-Geigy) to produce yellow solid ink ingots;

1.0 grams of Savinyl Blue GLS (C.I. Solvent Blue 44 from Sandoz) to produce cyan solid ink ingots; and 1.4 grams of Savinyl Black RLS-IJ (C.I. Solvent Black 45 from Sandoz) to produce solid black ink ingots.

EXAMPLE 3

This example demonstrates the high chroma ($C^*_{ab}$), and high ink thermal oxidation stability of the phase change ink compositions produced through the use of the phase change ink colorants of the present invention.

COLOR MEASUREMENTS OF PRINT SAMPLES

The reflectance spectra test data for the primary and secondary colors are listed in Table 1 below. (Measurement conditions were: Illuminate C, 2 degree observer, small area view, specular included, wavelength interval 10 nm.)

TABLE A

| Color   | $L^*$ | $A^*$  | $B^*$  | $DL^*$ | $Da^*$ | $Db^*$ | $DC^*ab$ | Hab    |
|---------|-------|--------|--------|--------|--------|--------|----------|--------|
| Black   | 23.69 | 1.86   | −2.57  | −69.68 | 0.95   | −0.58  | 0.99     | 305.82 |
| Cyan    | 58.03 | −27.36 | −39.38 | −35.34 | −28.26 | −37.39 | 45.77    | 235.21 |
| Magenta | 55.40 | 85.43  | −22.78 | −37.96 | 84.52  | −20.79 | 86.23    | 345.07 |
| Yellow  | 89.51 | −17.72 | 88.39  | −3.85  | −18.62 | 90.38  | 87.97    | 101.33 |
| Red     | 53.44 | 65.71  | 40.07  | −39.92 | 64.80  | 42.05  | 74.77    | 31.37  |
| Green   | 54.67 | −66.81 | 31.98  | −38.70 | −67.72 | 33.97  | 71.89    | 154.42 |
| Blue    | 33.88 | 43.45  | −48.42 | −59.49 | 42.55  | −46.43 | 62.88    | 311.91 |
| Paper   | 93.37 | .90    | −1.99  |        |        |        |          |        |

The phase change ink carrier composition and the magenta ink compositions of this invention have very high lightness ($L^*$) and chroma ($C^*_{ab}$) values.

INK THERMAL OXIDATION STABILITY TEST

In a typical test of the stability of a phase change ink composition, 800 grams of a molten ink sample was added to a one liter Erlenmeyer flask. A 23 cm Pasteur disposable borosilicate glass pipet is inserted into a two hole Teflon cap taped on the top of the flask, such that the pipet tip is about 1 cm off the bottom of the flask. Filtered air is blown through the pipet at the rate of 470 cc per minute. The flask is placed in an oven at 145 degrees C. The cooling effect of the air keeps the actual ink temperature at about 140 degrees C. The ink is heated and sparged typically between 120 to 140 hours.

Spectral strength of the phase change ink colorant in the ink is determined on a Perkin Elmer Lambda 3B Spectrophotometer. An acceptable colorant will have lost less than 10% of its spectral strength under the above vigorous conditions.

The phase change ink produced in accordance with the procedure outlined in EXAMPLE 2 was tested by the above procedure, and was found to have lost less than 10% of its spectral strength.

EXAMPLE 4

This example demonstrates the high degree of lightness ($L^*$) of the phase change ink carrier and ink composition, and the high chroma ($C^*_{ab}$) of the phase change ink composition of the present invention.

Two 2 inch square light transmissive glass plates were joined at opposite ends with a U.V. curable epoxy resin leaving the remaining opposite ends open. The plates were joined so that the plate faces were separated by a space of about 20 micron and were offset about 3/16 of an inch at the open ends to form entry lips. A sample of each of the yellow, magenta and cyan phase change ink ingots described in Example 1 were added to the space by placing it on one of the entry lips. The plates were then heated to a temperature of 106° C. At that temperature the ink became molten and flowed into the space formed between the plate faces by capillary action. Therefore, when the phase change ink cooled, a phase change ink of a substantially uniform thickness was produced. The transmission spectra test data for each primary color are listed in Table 1 below. (Measurement conditions were: Illuminate C, 2 degree observer, small area view, specular included, wavelength interval 10 nm.)

TABLE B

| Sample                    | $L^*$ | $a^*$  | $b^*$  | $C^*_{ab}$ | $h_{ab}$ |
|---------------------------|-------|--------|--------|------------|----------|
| Glass only                | 92.34 | −1.65  | 1.80   | 2.44       | 132.57   |
| Glass with ink carrier    | 86.51 | −0.64  | 4.54   | 4.58       | 98.03    |
| Glass with cyan ink       | 75.48 | −29.85 | −17.18 | 34.44      | 209.91   |
| Glass with magenta ink    | 56.01 | 69.12  | −39.24 | 79.48      | 330.41   |
| Glass with yellow ink     | 86.81 | −14.66 | 55.04  | 56.96      | 104.91   |
| Glass with black ink      | 19.45 | 7.48   | −13.02 | 15.01      | 299.89   |

The ink carrier and the yellow, magenta and cyan ink compositions of this invention had relatively high lightness ($L^*$) values, while the $L^*$ value of the black ink was relatively low high for the yellow, magenta and cyan inks of this invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A modified phase change ink composition comprising a modified phase change ink colorant in combination with a phase change ink carrier, said modified phase change ink colorant composition comprising the reaction product of (a) a tertiary alkyl primary amine and (b) dye chromophores having at least one pendant functional free acid group in the acid form, the dye chromophores, prior to the reaction with the tertiary primary amine, having a low degree of solubility in said phase change ink carrier, said phase change ink carrier being in a solid phase at ambient temperature and in a liquid phase at an elevated operating temperature, and thin films of uniform thickness of said modified phase change ink composition having a high degree of lightness, chroma and thermal stability.

2. The modified phase change ink colorant of claim 1, wherein said dye chromophores, prior to the reaction with the tertiary primary amine, comprise a C.I. Acid dye.

3. The modified phase change ink colorant of claim 1, wherein said dye chromophores, prior to the reaction with the tertiary primary amine, comprises C.I. Acid Red 52 dye.

4. The modified phase change ink colorant of claim 1, wherein said dye chromophores, prior to the reaction with the tertiary primary amine, comprises a C.I. Direct dye.

5. The modified phase change ink colorant of claim 1, wherein said dye chromophores comprise a free acid derivative of a xanthene dye.

6. The modified phase change ink colorant of claim 1, wherein said dye chromophores comprise a composition represented by the structural formula:

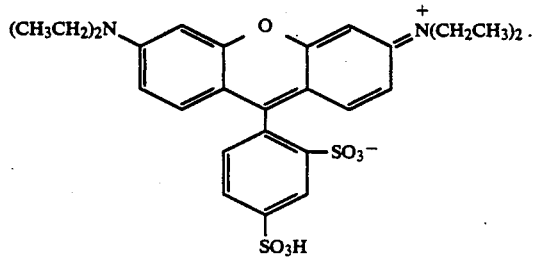

7. The modified phase change ink colorant of claim 1, wherein said tertiary alkyl primary amine comprises a composition represented by the structural formula:

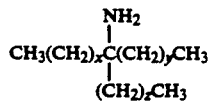

$x = 0-18$  $x + y + z = 8$ to $18$.
$y = 0-18$
$z = 0-18$

8. The modified phase change ink colorant of claim 1, wherein said tertiary alkyl primary amine comprises alkyl groups having a total of from 12 to 22 carbon atoms.

9. The modified phase change ink colorant composition of claim 1, which comprises a solvent soluble magenta dye which exhibits an intense, saturated color and a high degree of thermal stability.

10. The modified phase change ink colorant composition of claim 1, wherein the $C^*_{ab}$ value, of a substantially uniform thin film of about 20 micron thickness, of a subtractive primary yellow color phase change ink composition produced from said colorant composition, is at least about 40.

11. The modified phase change ink colorant composition of claim 1, wherein the $C^*_{ab}$ value, of a substantially uniform thin film of about 20 micron thickness, of a subtractive primary magenta color phase change ink composition produced from said colorant composition, is at least about 60.

12. The modified phase change ink colorant composition of claim 1, wherein the $C^*_{ab}$ value, of a substantially uniform thin film of about 20 micron thickness, of a subtractive primary cyan color modified phase change ink composition produced from said colorant composition, is at least about 25.

13. The modified phase change ink colorant composition of claim 1, wherein the $L^*$ value, of a substantially uniform thin film of about 20 micron thickness, of a black color of a phase change ink composition produced from said colorant composition, is not more than about 30.

14. The modified phase change ink colorant composition of claim 1, wherein thin films of uniform thickness of said ink composition are rectilinearly light transmissive.

15. A process for producing a modified phase change ink composition which comprises combining a modified phase change ink colorant composition and a phase change ink carrier, said modified phase change ink colorant composition comprising the reaction product of (a) a tertiary alkyl primary amine and (b) dye chromophores having at least one pendant functional free acid group in the acid form, the modified dye chromophores prior to the reaction with the tertiary primary amine, having a low degree of solubility in said phase change ink carrier, said phase change ink carrier being in a solid phase at ambient temperature and in a liquid phase at an elevated operating temperature, and thin films of uniform thickness of said modified phase change ink composition having a high degree of lightness, chroma and thermal stability.

16. The process of claim 15, wherein said dye chromophores, prior to the reaction with the tertiary primary amine, comprise a C.I. Acid dye.

17. The process of claim 15, wherein said dye chromophores, prior to the reaction with the tertiary primary amine, comprises C.I. Acid Red 52 dye.

18. The process of claim 15, wherein said dye chromophores, prior to the reaction with the tertiary primary amine, comprises a C.I. Direct dye.

19. The process of claim 15, wherein said dye chromophores comprise a free acid derivative of a xanthene dye.

20. The process of claim 15, wherein said dye chromophores comprise a composition represented by the structural formula:

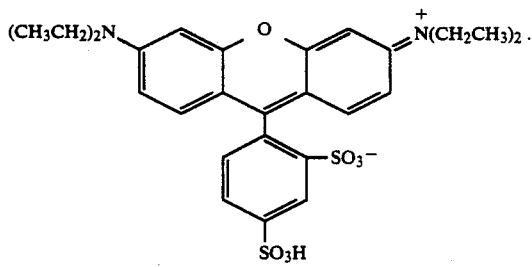

21. The process of claim 15, wherein said tertiary alkyl primary amine comprises a composition represented by the structural formula:

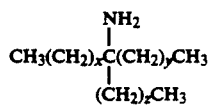

$x = 0\text{--}18$   $x + y + z = 8 \text{ to } 18$.
$y = 0\text{--}18$
$z = 0\text{--}18$ 22. The process of claim 15, wherein the $C^*_{ab}$ value, of a substantially uniform thin film of about 20 micron thickness, of a subtractive primary yellow color phase change ink composition produced from said colorant composition, is at least about 40.

23. The process of claim 15, wherein the $C^*_{ab}$ value, of a substantially uniform thin film of about 20 micron thickness, of a subtractive primary magenta color phase change ink composition produced from said colorant composition, is at least about 60.

24. The process of claim 15, wherein the $C^*_{ab}$ value, of a substantially uniform thin film of about 20 micron thickness, of a subtractive primary cyan color modified phase change ink composition produced from said colorant composition, is at least about 25.

25. The process of claim 15, wherein the $L^*$ value, of a substantially uniform thin film of about 20 micron thickness, of a black color of a phase change ink composition produced from said colorant composition, is not more than about 35.

26. The process of claim 15, wherein thin films of uniform thickness of said ink composition being rectilinearly light transmissive.

* * * * *